United States Patent [19]

Tokunaga et al.

[11] 4,297,141

[45] Oct. 27, 1981

[54] OPTICAL GLASS FOR OPTICAL PATHS

[75] Inventors: Shinobu Tokunaga, Yono; Yuichi Shiina, Warabi, both of Japan

[73] Assignee: Sumita Optical Glass Manufacturing Co., Ltd., Japan

[21] Appl. No.: 208,481

[22] Filed: Nov. 19, 1980

Related U.S. Application Data

[63] Continuation-in-part of Ser. No. 69,107, Aug. 21, 1979, abandoned.

[30] Foreign Application Priority Data

Sep. 5, 1978 [JP] Japan .................. 53-108882
Apr. 9, 1979 [JP] Japan .................. 54-42921

[51] Int. Cl.$^3$ .......................... C03C 3/04; C03C 3/08
[52] U.S. Cl. ............................ 501/67; 501/70
[58] Field of Search .......... 106/47 Q, 52, 54

[56] References Cited

U.S. PATENT DOCUMENTS

| | | | |
|---|---|---|---|
| 3,954,487 | 5/1976 | Gliemeroth et al. | 106/47 Q |
| 4,012,131 | 3/1977 | Krohn et al. | 106/47 Q |
| 4,036,623 | 7/1977 | Deeg et al. | 106/47 Q |
| 4,042,405 | 8/1977 | Krohn et al. | 106/47 Q |
| 4,106,946 | 8/1978 | Ritze | 106/47 Q |

FOREIGN PATENT DOCUMENTS 1596981 2/1972 Fed. Rep. of Germany .... 106/47 Q

*Primary Examiner*—O. R. Vertiz
*Assistant Examiner*—Mark Bell
*Attorney, Agent, or Firm*—Wenderoth, Lind & Ponack

[57] ABSTRACT

The present invention relates to an optical glass for an optical path, having a refractive index of at least 1.55, an Abbe number of at least 48 and a specific gravity of at most 2.90 and being excellent in chemical durability, having a chemical composition of:

| | |
|---|---|
| $SiO_2$ | 55 to 65% by weight |
| $B_2O_3$ | 0 to 10 |
| $TiO_2 + ZrO_2$ | 1 to 5 |
| $TiO_2$ | 0 to 5 |
| $ZrO_2$ | 0 to 5 |
| $CaO + ZnO$ | 20 to 33 |
| $CaO$ | 5 to 20 |
| $ZnO$ | 3 to 20 |
| $Al_2O_3$ | 0 to 4 |
| one or more of $R_2O$ ($Li_2O$, $Na_2O$, $K_2O$) | 5 to 9 |
| $As_2O_3$ | 0 to 1 |

1 Claim, No Drawings

OPTICAL GLASS FOR OPTICAL PATHS

This is a continuation-in-part of Ser. No. 69,107 filed Aug. 21, 1979, now abandoned.

BACKGROUND OF THE INVENTION

1. Field of the Invention

The present invention relates to an optical glass for an optical path and more particularly, it is concerned with an optical glass for an optical path, having a refractive index (nd) of 1.55 or more, Abbe number ($\nu$d) of 48 or more and a specific gravity of 2.90 or less and being excellent in chemical durability.

2. Description of the Prior Art

As an element for general optical systems, there are used lenses, prisms, mirrors and the like. Optical glass has generally been used as a material for such an element requiring a high precision in many cases. This optical glass has been considered for use as a lens in view of its refractive index and dispersion. A lens can be regraded as an element for modification of light utilizing the refractive index and spherical surface of glass. Similarly, a prism is an element for modification of light. However, this is an optical element utilizing a pane of glass, not a spherical surface of glass, and in many cases, it reflects or transmits light into the interior part of the glass. It has thus been considered as an element for controlling the length of the optical path and for modifying the symmetry axis. Up to the present time, however, an optical glass developed and used for lenses has only been diverted to the purpose for controlling the length of the optical path, for example, a prism glass for a binocular, and there has been optical glass developed exclusively for a prism. When an optical glass for a lens is used for a prism, therefore, there are both merits and demerits. For example, optical glass commonly called "BK-7" and "BaK-4" have generally been used as a prism glass for binoculars. The properties of BK-7 and BaK-4 are shown in Table 1, in which the resistivity to acid is measured according to Japanese Optical Glass Industrial Standards "Measuring Method for Chemical Durability of Optical Glass (Powder method)".

TABLE 1

|  | BK-7 | BaK-4 |
|---|---|---|
| nd | 1.51633 | 1.56883 |
| $\Gamma$d | 64.0 | 56.0 |
| Specific Gravity | 2.52 | 3.11 |
| Resistivity to Acid % | 0.15 | 0.35 |

BK-7 and BaK-4 have generally the following composition (% by weight):

| BK-7 | | | |
|---|---|---|---|
| $SiO_2$ | 68.9 | $K_2O$ | 8.4 |
| $B_2O_3$ | 10.1 | BaO | 2.8 |
| $Na_2O$ | 8.8 | $As_2O_3$ | 1.0 |
| BaK-4 | | | |
| $SiO_2$ | 50.4 | BaO | 19.7 |
| $B_2O_3$ | 5.9 | PbO | 2.0 |
| $Na_2O$ | 4.0 | $Sb_2O_3$ | 0.5 |
| $K_2O$ | 5.0 | $As_2O_3$ | 1.0 |
| ZnO | 11.5 | | |

As evident from Table 1, BK-7 has the advantages that the specific gravity is smaller and the chemical durability is relatively excellent, but has the disadvantage that the refractive index is smaller, while BaK-4 has the advantage that the refractive index is larger, but has the disadvantages that the chemical durability is lower and the specific gravity is larger. Since four prisms are used in one binocular and thus the weight thereof depends on the weight of the prism to a greater extent, the use of a prism with a light weight is of course important, but in the case of using a prism with a heavy weight, efforts to lighten the binocular have hitherto been made by using a light metal for the metallic parts of the binocular. However, a light metal tends to pose a danger of ignition when it is processed. It is thus preferable that the weight of a prism be as light as possible. Where a prism has a small refractive index, a binocular using the same has the disadvantage that the exit pupil as a conclusive factor of the performance of a binoclar is not of a true circle and there appear shadows (dark portions) at the four corners. Therefore, it is desirable that a binocular prism have a reasonably high refractive index of 1.55 or more is required for an ordinary binocular prism in order to remove such shadows. It is also desired that the Abbe number be as large as possible considering the chromatic aberration. In addition, the better the chemical durability of a prism is desirable. If the chemical durability is bad, tarnish takes place during polishing a prism, resulting in marked decrease of the yield of the prism, that is, increase of the production cost.

Moreover, optical glasses having a light weight and high refractive index have been proposed (Japanese Patent Publication Nos. 5127/1959 and 5128/1959), but they have been developed mainly as eyeglasses and thus they cannot avoid the disadvantages that in the case of using for optical paths, in particular, prisms, the chemical durability is insufficient, the Abbe number is too small and the percent transmission is inferior due to the length of the optical path.

SUMMARY OF THE INVENTION

It is an object of the present invention to provide an optical glass for an optical path, in particular, for a prism, having a refractive index of 1.55 or more, an Abbe number of 48 or more and specific gravity of 2.90 or less and being excellent in chemical resistance.

This object can be effectively attained by an optical glass for an optical path, having a composition represented by % by weight:

| | |
|---|---|
| $SiO_2$ | 55 to 65% |
| $B_2O_3$ | 0 to 10 |
| $TiO_2 + ZrO_2$ | 1 to 5 |
| $TiO_2$ | 0 to 5 |
| $ZrO_2$ | 0 to 5 |
| CaO + ZnO | 20 to 33 |
| CaO | 5 to 20 |
| ZnO | 3 to 20 |
| $Al_2O_3$ | 0 to 4 |
| one or more of $R_2O(Li_2O, Na_2O, K_2O)$ | 5 to 9 |
| $As_2O_3$ | 0 to 1 |

DETAILED DESCRIPTION OF THE INVENTION

We, the inventors, have made various efforts to obtain an optical glass for an optical path, free from the above described disadvantages of the prior art optical glasses and consequently, have succeeded in finding an optical glass for an optical path, having a refractive index of at least 1.55, an Abbe number of at least 48 and a density of at most 2.90 and being excellent markedly in chemical resistance. This invention is based on this finding.

That is to say, the optical glass for an optical path according to the present invention has a chemical composition (% by weight) comprising 55 to 65% $SiO_2$, 0 to 10% $B_2O_3$, 1 to 5% ($TiO_2+ZrO_2$), 0 to 5% $TiO_2$, 0 to 5% $ZrO_2$, 20 to 33% ($CaO+ZnO$), 5 to 20% CaO, 3 to 20% ZnO, 5 to 9% one or more of $R_2O$ ($Li_2O$, $Na_2O$, $K_2O$), 0 to 4% $Al_2O_3$ and 0 to 1% $As_2O_3$ and can be prepared by mixing and melting the corresponding components or compounds in conventional manner.

The reasons for limiting thereto the proportions of the components are as follows:

$SiO_2$ is an essential component and is preferably in a proportion of 55 to 65% by weight since if less than 55% by weight, the chemical durability is deteriorated, while if more than 65% by weight, the viscosity of the glass is too increased to give a uniform property. $B_2O_3$ is an optical component and used for improving the stability and melting property of glass, and if more than 10% by weight, the chemical durability is deteriorated and the glass is unstable. $TiO_2$ and/or $ZrO_2$ are an essential component and $TiO_2+ZrO_2$ are preferably in a proportion of 1 to 5% by weight, since if less than 1% by weight, its effect of increasing the refractive index and improving the chemical durability is lowered, while if more than 5% by weight, the Abbe number is decreased, the problem of chromatic aberration rises and the specific gravity is increased. Regarding the each component, if $TiO_2$ exceeds 5% by weight, the Abbe number is decreased and the problem of chromatic aberration rises and if $ZrO_2$ exceeds 5% by weight, the specific gravity is increased. CaO is an essential component and is preferably in a proportion of 5 to 20% by weight, since if less than 5% by weight, not only the refractive index is lowered but also melting of glass is difficult, while if more than 20% by weight, the chemical durability is deteriorated. ZnO is an essential component and is preferably in a proportion of 3 to 20% by weight, since if less than 3% by weight, its effect of increasing the refractive index and improving the stability and chemical durability is lowered, while if more than 20% by weight, there is such a tendency that the glass is hard to be melted. CaO+ZnO are preferably in a portion of 20 to 33% by weight, since if less than 20% by weight, not only the refractive index is lowered but also melting of glass is difficult, while if more than 33% by weight, not only the chemical durability is deteriorated but also specific gravity is increased. $R_2O$ ($Li_2O$, $Na_2O$, $N_2O$) are an essential component and one or more of $R_2O$ is preferably in a proportion of 5 to 9% by weight since if less than 5% by weight, the glass is hard to be melted, while if more than 9% by weight, the chemical durability is deteriorated. $Al_2O_3$ is an optional component, but is preferably in a proportion of 0 to 4% by weight, since if more than 4% by weight, a uniform glass is hard to obtain. $As_2O_3$ is n optional component, but is preferably in a proportion of 0 to 1% by weight, since $As_2O_3$ acts as a defoaming agent when glass is melted.

In a preferred embodiment of the present invention, the optical glass for a prism, having a specific gravity of 2.80 or less, is of $SiO_2$-$B_2O_3$-CaO-ZnO-$R_2O$-$TiO_2$ and/or -$ZrO_2$ type having a chemical composition (% by weight) of 55–65% $SiO_2$, 1 to 10% $B_2O_3$, 0 to 5% $Ti_2$, 0 to 5% $ZrO_2$, 1 to 5% ($TiO_2+ZrO_2$), 10 to 20% CaO, 3 to 15% ZnO, 21 to 27% (CaO+ZnO), 5 to 9% one or more of $R_2O$ ($Li_2O$, $Na_2O$, $K_2O$), 0 to 4% $Al_2O_3$ and 0 to 1% $As_2O_3$.

In the optical glass for an optical path according to the present invention, other components such as MgO, SrO, BaO and the like can be incorporated in a proportion of up to several percents.

The following examples are given in order to illustrate the present invention in detail without limiting the same.

Example 1 to 5

The results are shown in table 2.

TABLE 2

| | (% by weight) | | | | |
|---|---|---|---|---|---|
| Example | No. 1 | No. 2 | No. 3 | No. 4 | No. 5 |
| $SiO_2$ | 58.0 | 55.5 | 64.0 | 58.3 | 61.2 |
| $B_2O_3$ | 5.0 | 8.5 | 1.0 | 5.0 | 3.0 |
| $TiO_2$ | 2.8 | 1.5 | 4.0 | — | 1.5 |
| $ZrO_2$ | — | — | — | 4.0 | 1.4 |
| CaO | 15.0 | 11.0 | 18.0 | 13.8 | 16.5 |
| ZnO | 8.0 | 14.0 | 5.0 | 8.1 | 6.5 |
| $Li_2O$ | — | — | 1.0 | — | — |
| $Na_2O$ | 4.0 | 3.0 | 3.2 | 3.9 | 4.0 |
| $K_2O$ | 5.0 | 2.5 | 3.5 | 5.1 | 4.7 |
| $Al_2O_3$ | 1.8 | 3.0 | — | 1.5 | 0.7 |
| $As_2O_3$ | 0.4 | 1.0 | 0.3 | 0.3 | 0.5 |
| nd | 1.56430 | 1.55534 | 1.56703 | 1.56318 | 1.56109 |
| Γd | 54.6 | 56.6 | 53.9 | 56.3 | 55.6 |
| Specific Gravity | 2.70 | 2.72 | 2.68 | 2.74 | 2.70 |
| Resistivity to Acid % | 0.03 | 0.15 | 0.02 | 0.04 | 0.03 |

Example 6 to 10

The results are shown in Table 3.

TABLE 3

| | (% by weight) | | | | |
|---|---|---|---|---|---|
| Example | No. 6 | No. 7 | No. 8 | No. 9 | No. 10 |
| $SiO_2$ | 55.0 | 65.0 | 57.0 | 55.9 | 58.3 |
| $B_2O_3$ | 4.5 | — | — | 9.0 | 5.0 |
| $TiO_2$ | 3.5 | 3.0 | 5.0 | 1.5 | 1.0 |
| $ZrO_2$ | — | — | — | — | 4.0 |
| CaO | 7.7 | 20.0 | 20.0 | 10.5 | 13.8 |
| ZnO | 20 | 3.0 | 12.7 | 15.0 | 7.1 |
| $Li_2O$ | — | — | — | — | 2.0 |
| $Na_2O$ | 4 | 4.0 | 2.0 | 3.1 | 3.9 |
| $K_2O$ | 5 | 4.0 | 3.0 | 3.1 | 2.9 |
| $Al_2O_3$ | — | — | — | 3.0 | 1.5 |
| $As_2O_3$ | 0.3 | 1.0 | 0.3 | 0.3 | 0.5 |
| nd | 1.57687 | 1.56244 | 1.60082 | 1.55572 | 1.56822 |
| Γd | 50.8 | 54.3 | 49.9 | 56.8 | 52.6 |
| Specific Gravity | 2.84 | 2.66 | 2.87 | 2.72 | 2.75 |
| Resistivity to Acid % | 0.05 | 0.13 | 0.06 | 0.15 | 0.03 |

As is apparent from the foregoing illustration, an optical glass for an optical path, in particular, binocular prism, having a refractive index of at least 1.55, an Abbe number of at least 48 and a specific gravity of at most 2.90 and having a very excellent chemical durability, can be obtained according to the present invention.

What is claimed is:

1. An optical glass for an optical path having a refractive index of at least 1.55, an Abbe number of at least 48 and a specific gravity of at most 2.90, which consists essentially of

| | |
|---|---|
| SiO$_2$ | 55 to 65% by weight |
| B$_2$O$_3$ | 0 to 10 |
| TiO$_2$ + ZrO$_2$ | 1 to 5 |
| TiO$_2$ | 0 to 5 |
| ZrO$_2$ | 0 to 5 |
| CaO + ZnO | 20 to 33 |
| CaO | 5 to 20 |
| ZnO | 3 to 20 |
| Al$_2$O$_3$ | 0 to 4 |
| at least one of R$_2$O (Li$_2$O, Na$_2$O, K$_2$O) | 5 to 9 |
| As$_2$O$_3$ | 0 to 1 |

* * * * *

UNITED STATES PATENT AND TRADEMARK OFFICE
CERTIFICATE OF CORRECTION

PATENT NO. : 4,297,141
DATED : October 27, 1981
INVENTOR(S) : Shinobu Tokunaga and Yuichi Shiina It is certified that error appears in the above—identified patent and that said Letters Patent is hereby corrected as shown below:

Column 1, Table 1, left-hand column, line 3 from the bottom, change "Γd" to -- νd --;

Column 3, line 21, change "optical" to -- optional --;
line 52, change "N$_2$O" to -- K$_2$O --;
line 59, change "n" to -- an --;
line 67, change "Ti$_2$" to -- TiO$_2$ --;

Column 4, Table 2, left-hand column, line 5 from the bottom, change "Γd" to -- νd --;

Column 4, Table 3, left-hand column, line 5 from the bottom, change "Γd" to -- νd --.

Signed and Sealed this

Tenth Day of August 1982

[SEAL]

Attest:

GERALD J. MOSSINGHOFF

Attesting Officer     Commissioner of Patents and Trademarks